United States Patent [19]

Scheffler et al.

[11] 4,220,179
[45] Sep. 2, 1980

[54] SPACER FOR COAXIAL TUBE SYSTEMS

[75] Inventors: Ernst Scheffler; Friedrich Schatz; Gerhard Ziemek, all of Langenhagen, Fed. Rep. of Germany

[73] Assignee: Kabel-und Metallwerke Gutehoffnungshutte Aktiengesellschaft, Hanover, Fed. Rep. of Germany

[21] Appl. No.: 13,043

[22] Filed: Feb. 21, 1979

Related U.S. Application Data

[62] Division of Ser. No. 847,083, Oct. 31, 1977, Pat. No. 4,161,960.

[30] Foreign Application Priority Data

Oct. 23, 1975 [DE] Fed. Rep. of Germany ....... 2547423

[51] Int. Cl.³ .............................................. F16L 9/18
[52] U.S. Cl. .................................... 138/113; 138/38; 138/148; 138/149; 138/114
[58] Field of Search ................. 138/38, 111, 112, 113, 138/114, 148, 149

[56] References Cited

U.S. PATENT DOCUMENTS

| 8,745 | 6/1879 | Meriam | 138/114 |
| 319,738 | 6/1885 | McKinney | 138/148 |
| 497,536 | 5/1893 | Cummings | 138/114 X |
| 644,841 | 3/1900 | Allen | 138/148 X |
| 2,131,987 | 10/1938 | Studt et al. | 138/148 X |
| 3,473,575 | 10/1969 | Vogelsang et al. | 138/114 X |
| 3,592,238 | 7/1971 | Scheffler et al. | 138/114 |
| 3,595,275 | 7/1971 | Stearns et al. | 138/114 |
| 3,670,772 | 6/1972 | Ziemek et al. | 138/114 |
| 4,121,623 | 10/1978 | Rhore | 138/114 |

FOREIGN PATENT DOCUMENTS 1008040 10/1965 United Kingdom ..................... 138/113

Primary Examiner—Richard E. Aegerter
Assistant Examiner—James E. Bryant, III
Attorney, Agent, or Firm—Smyth, Pavitt, Siegemund, Jones & Martella

[57] ABSTRACT

Spacer for concentrically disposed tube systems where a temperature drop exists between adjacent tubes. This may consist, for example, of a superconducting electric cable or alternatively of a tube system for carrying heated liquid or gaseous media. The concentric tubes are spaced by a winder which touches the surfaces of adjacent tubes at particular points and which consists of two ribbons of insulating material disposed adjacent to each other having two elements in-between, and one of them being wound about the other so that they touch adjacent ribbon surfaces only in isolated points.

3 Claims, 3 Drawing Figures

SPACER TWISTED

SPACER FOR COAXIAL TUBE SYSTEMS

This is a division, of application Ser. No. 847,083, filed Oct. 31, 1977 now U.S. Pat. No. 4,161,960.

BACKGROUND OF THE INVENTION

This invention relates to spacers for coaxially arranged tube systems where a temperature difference exists between individual tubes. Specifically the tubes are spaced from each other by helical spacers which include ribbons or strips of insulating material and having low thermal conductivity, these strips being so arranged that they touch the respective tubes only at individual areas.

It is already known, for example, to utilize cable cooled to very low temperatures for transmitting electric energy. In this case the conductor consists of a tube the interior of which is cooled by liquid helium. In order to protect the tube from externally supplied heat, additional tubes are provided which concentrically surround the central tube and which are spaced from each other. A vacuum may be maintained in a space between the innermost and the adjacent tube. The separation between the second and third tube is conventionally filled with liquid nitrogen in order to control the temperature drop towards the interior. The space between the third and the last tube may again be evacuated and this last or outermost tube has ambient temperature. Similarly arranged tube systems which may not be cooled with liquid nitrogen may also be utilized for transporting liquified gases or other media at very low temperatures. Essential for all these constructions is the fact that the heat loss either by conduction of heat or by radiation is reduced to a minimum without which economical operation of such systems would not be possible.

To this end innumerable proposals have been made for spacers providing a minimum of heat loss. For example, the spacer may be arranged in the form of helical coils surrounding the innermost tube or disc shaped supporting elements to support the tubes in concentric relationship.

U.S. Pat. No. 3,592,238 and No. 3,670,772 disclose spacer constructions for coaxial tube systems in which the helical spacer is constructed from individual ribbons which are loosely superimposed upon each other. The ribbons or strips may additionally be twisted in the form in which they are used in order to further reduce the heat transfer from one tube to another.

SUMMARY OF THE INVENTION

It is accordingly an object of the present invention to provide a helical spacer construction of this type which further minimizes the heat transfer between two adjacent tubes by the special arrangement or construction of the ribbons jointly forming a helix.

A further object of the present invention is to further reduce the heat loss which occurs when the known winder is used in order to provide an economical energy transfer.

These objects are accomplished in accordance with the preferred embodiment of the present invention for spacers for coaxial tube systems as previously discussed by the particular construction or arrangement of individual flat, elongated elements such as ribbons or strips, whereby, in between two such ribbons, one provides a spacer element about which a string-like filament is coiled. This spacer element may be another string or strand, so that two such strings are stranded together; or the spacer element may be a flap strip, and the strip-like element is helically wound around it and touches adjacent ribbon surfaces in individual points. This makes possible the use of a helical construction for the spacer of such tube systems without causing an uneconomical heat invasion. Heat bridges between the respective inner and outer tubes occur only at individual points or lines. Independently, therefrom, the helix guarantees the necessary distance between the tubes along the entire length of the tube system in such a manner that the two tubes cannot touch each other as that could cause a failure of the cable or tube system.

It may be advantageous in certain cases to secure the individual elements forming the spacer assembly to each other by mechanical means such as sewing, nailing or pasting; this may be done within predetermined distances. This in turn yields certain advantages for the manufacture of such tube systems suitable for very low temperatures.

The individual ribbons of the spacer may consist of any material suitable for low temperatures. Synthetic materials such as those based on polytetrafluorethylene may be used. In some cases further advantages may be obtained when the individual adjacent ribbons consist of different material. In this case layers of different heat transfer quality and mechanical stability may alternate. A selection of the material according to the particular construction of the spacers may be suitable where at different places of the spiral spacer, different mechanical forces such as compression and tension forces are active.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings, in which:

Referring now to FIG. 3, there is illustrated a spacer prior to being wound spirally on a tube A in spaced-apart loops for supporting thereon another tube B in concentric relation thereto. For purposes of this disclosure the tube system can be of the same type as shown in U.S. Pat. Nos. 3,592,238 and 3,670,772. The specific spacer shown in FIG. 1 consists of two strips or ribbons 1 and 2 between which is disposed a string or strand being comprised of two individual elements 3 and 4 which in turn space the two ribbons 1 and 2. The spacer assembly is sewn together as indicated by the thread 20.

This construction provides a point or line-like contact between adjacent surfaces of the ribbons or strips in order to reduce the heat transfer loss. The assembly is then helically wound onto a tube.

Figure 1:
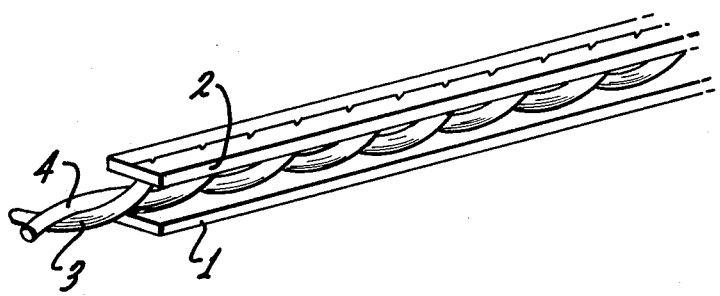
FIGS. 1 and 2 are, respectively, views in perspective of different embodiments of the spacer of the invention.
Figure 2:
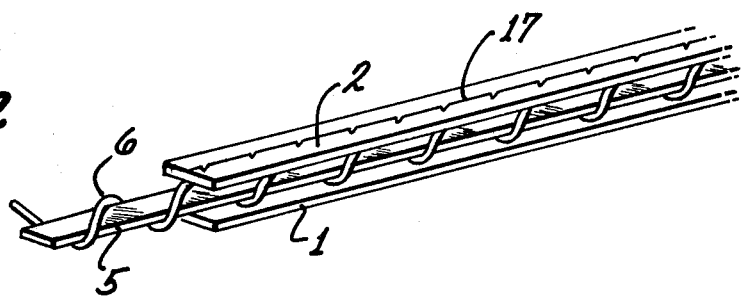
Figure 3:
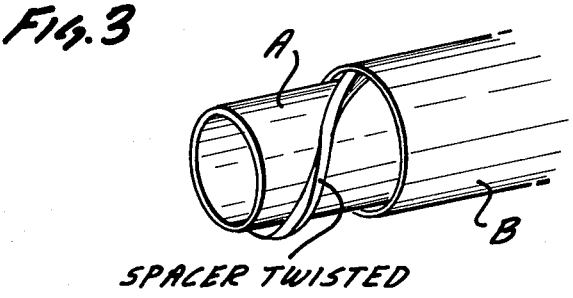
FIG. 3 illustrates spacer of the invention as used between two concentric tubes.

A similar construction is illustrated in FIG. 2 where between the spaced ribbons or strips 1 and 2 there is disposed a third ribbon 5 surrounded by a helical string 6 which provides the mechanical contact between ribbons 1 and 2.

As shown, point contacts are provided only between the elements. Accordingly, when this spacer is utilized for spacing concentric tubes, only line-like or even point-like contacts are made with the adjacent tube surfaces and/or adjacent spacer element surfaces, particularly when the adjacent tube surfaces consist of corrugated metal tubes, contact therewith is point-like. The spacers as described with reference to the drawings provide a minimum of heat transfer between individual tubes. Therefore, the entire coaxial tube system can be operated economically.

The invention is not limited to the embodiments described above but all changes and modifications thereof not constituting departures from the spirit and scope of the invention are intended to be included.

We claim:

1. A coaxial tube system, including a helical spacer for spacing an inner tube of the system from another tube thereof in coaxial relation, there being a temperature gradient between the tubes, the helical spacer comprising an assembly of a plurality of flat, elongated, superposed, relatively narrow elements, including a first and a second ribbon; a third, elongated element disposed between the first and the second ribbon; and a filament element helically looped around the third element, but not around the first and second ribbon, so that the third element and the filament are held between the first and second ribbons, the assembly as a whole being helically placed on said inner tube.

2. Spacer as in claim 1, said elongated element being another filament element, the filaments being stranded about each other.

3. Spacer as in claim 1, said elongated element being a flat strip, the filament being helical wound about the element.

* * * * *